(12) United States Patent
Cariou et al.

(10) Patent No.: US 12,495,332 B2
(45) Date of Patent: Dec. 9, 2025

(54) MULTI-LINK TRAFFIC STEERING WITH TRAFFIC INDICATION MAP

(71) Applicant: Intel Corporation, Santa Clara, CA (US)

(72) Inventors: Laurent Cariou, Milizac (FR); Minyoung Park, San Ramon, CA (US); Po-Kai Huang, San Jose, CA (US); Alexander Min, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 143 days.

(21) Appl. No.: 18/477,904

(22) Filed: Sep. 29, 2023

(65) Prior Publication Data

US 2024/0031871 A1    Jan. 25, 2024

Related U.S. Application Data

(63) Continuation of application No. 17/067,740, filed on Oct. 11, 2020, now abandoned.

(60) Provisional application No. 62/913,948, filed on Oct. 11, 2019.

(51) Int. Cl.
*H04W 28/12* (2009.01)
*H04L 1/1607* (2023.01)

(52) U.S. Cl.
CPC ........... *H04W 28/12* (2013.01); *H04L 1/1614* (2013.01)

(58) Field of Classification Search
CPC ........... H04L 1/1614; H04W 28/0263; H04W 28/12; H04W 40/244; H04W 76/15; H04W 84/12; Y02D 30/70
See application file for complete search history.

(56) References Cited

U.S. PATENT DOCUMENTS

| | | | |
|---|---|---|---|
| 2020/0359259 A1* | 11/2020 | Patil | H04W 88/08 |
| 2021/0037583 A1* | 2/2021 | Seok | H04W 76/15 |
| 2021/0068054 A1* | 3/2021 | Ahn | H04W 52/0229 |
| 2021/0068184 A1* | 3/2021 | Chu | H04W 80/08 |
| 2022/0287122 A1* | 9/2022 | Wang | H04W 8/22 |

* cited by examiner

*Primary Examiner* — Pao Sinkantarakorn
(74) *Attorney, Agent, or Firm* — Eversheds Sutherland (US) LLP

(57) ABSTRACT

This disclosure describes systems, methods, and devices related to multi-link traffic steering. A device may establish one or more links with a station multi-link device (STA MLD), wherein the STA MLD comprises one or more logical entities defining separate station devices. The device may generate a traffic indication map (TIM) bitmap of a plurality of bits, wherein one or more bits are associated with an association identification (AID) corresponding to the STA MLD. The device may set the one or more bits to a first value to indicate that there is data to be retrieved by the STA MLD on any of the one or more links. The device may generate one or more beacon frames each comprising a same TIM element, wherein the TIM element comprises the TIM bitmap. The device may cause to send one or more beacon frames on each of the one or more links.

20 Claims, 11 Drawing Sheets

MULTI-LINK TRAFFIC STEERING WITH TRAFFIC INDICATION MAP

CROSS-REFERENCE TO RELATED APPLICATION(S)

This application is a continuation of U.S. Non-Provisional application Ser. No. 17/067,740, filed Oct. 11, 2020, which claims the benefit of U.S. Provisional Application No. 62/913,948, filed Oct. 11, 2019, the disclosures of which are incorporated herein by reference as if set forth in full.

TECHNICAL FIELD

This disclosure generally relates to systems and methods for wireless communications and, more particularly, to multi-link traffic steering with traffic indication map (TIM).

BACKGROUND

Wireless devices are becoming widely prevalent and are increasingly requesting access to wireless channels. The Institute of Electrical and Electronics Engineers (IEEE) is developing one or more standards that utilize Orthogonal Frequency-Division Multiple Access (OFDMA) in channel allocation.

DETAILED DESCRIPTION

Figure 1:
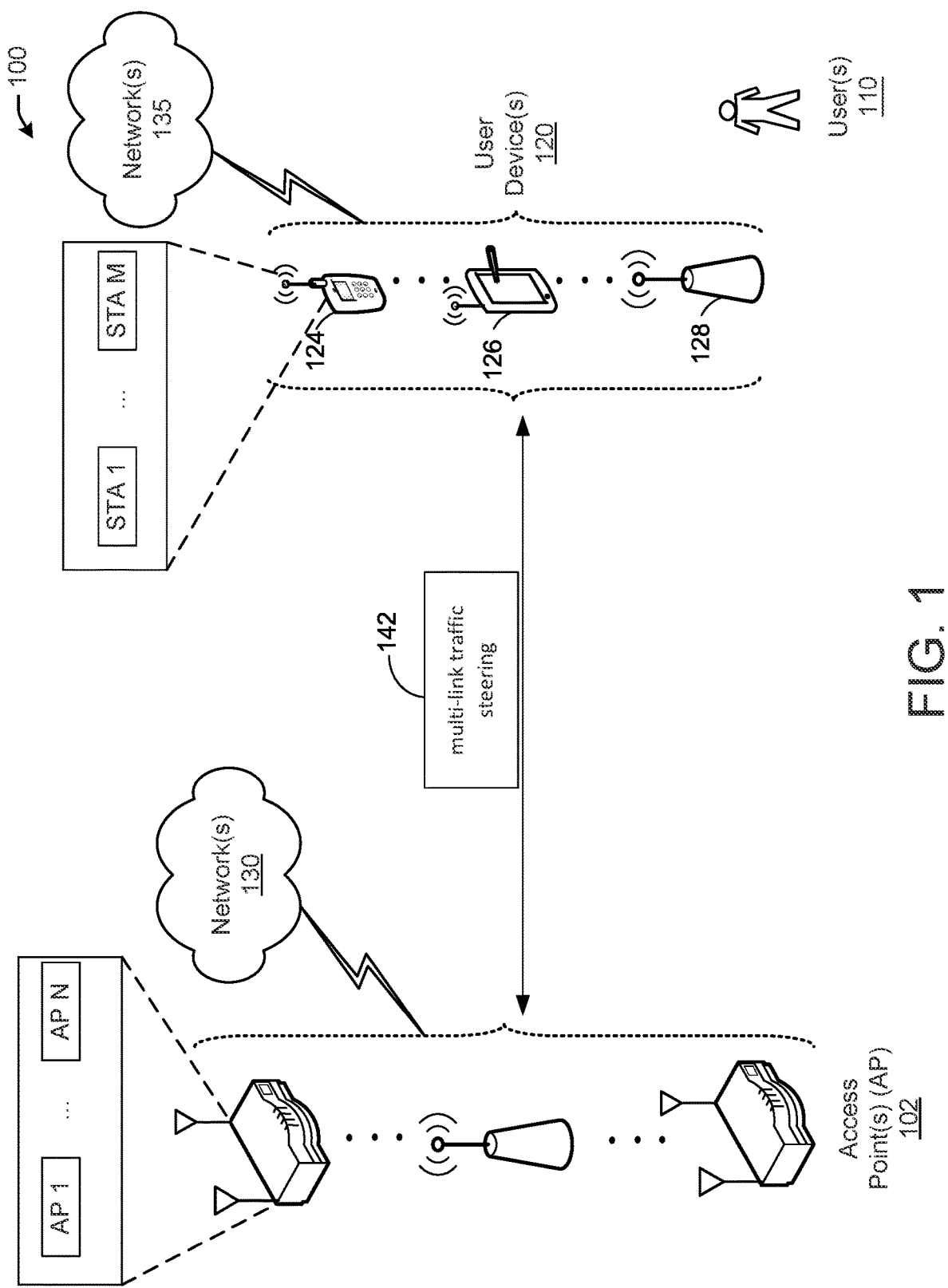
FIG. 1 is a network diagram illustrating an example network environment for multi-link traffic steering, in accordance with one or more example embodiments of the present disclosure.

The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

When a station device (STA) is in a power save mode and a doze state, the access point (AP) cannot transmit any frames to the STA, and therefore the AP buffers these frames (called bufferable units (BUs)) in its memory, waiting to be able to deliver these BUs to the STA when it will transition to the awake state.

Beacon frames are sent generally every 100 ms, and carry a TIM element that include a partial virtual bitmap (also can be referred to as TIM bitmap), that has one bit for every associated STA (e.g., bit with the index corresponding to the AID of the STA). For each STA that is in power save mode and doze state, the bit is set to 1 to indicate that the AP has buffered traffic for the STA, and that it shall send a PS-Poll or unscheduled automatic power save delivery (U-APSD) trigger frame or any other indication that it is in the awake state to the AP, so that the AP sends the BUs to the STA. This bit is set to 0 if the AP has no BUs for the STA.

Thanks to this, the STA that wants to save power goes into power save mode and doze state, and just wakes up to receive some beacons, and read the TIM element to see if the AP has any BUs for it. If it does, the STA will then wake up to retrieve the data. If it does not, it will go back to doze state until the next beacon that it wants to receive.

Opportunistic power save (OPS) has been defined to solve a specific problem. When a STA has a large burst of data to send or receive, it will usually move to active mode (and be awake all the time), or it will stay in power save (PS) mode but will be awake for as much time as possible, because it wants to be as available as possible to transmit/receive its burst of data as fast as possible. When the medium is congested, the STA will often wait in the awake state for a long time (while other STAs transmit/receive). OPS provides a way for the AP to tell all its associated STAs if, based on the queues and scheduling knowledge on the AP side, if they will be scheduled (meaning the AP will send them frames in DL or trigger frame to schedule them for UL transmission) in the incoming OPS period (20 ms or so). If the STA is not scheduled, it may go to doze state for the remaining of the OPS period. OPS also uses the TIM element, carried in an OPS frame or fast initial link setup (FILS) discovery frame (DF), but now the meaning of the bit corresponding to the AID of a STA is different. It is set to 1 to indicate that the STA will be scheduled in the OPS period, and it is set to 0 to indicate that the STA will not be scheduled in the OPS period.

It may be needed to modify the power management operation using the TIM element in beacons and OPS operation in order to make it applicable to the multi-link device (MLD) situations.

Taking an example with 2 links (2 APs), and with all TIDs being mapped to all links (meaning that all TIDs are allowed to be sent/received on each link).

The TIM element in beacon frame from each of the link will provide the information whether the AP MLD has BUs that are buffered for the STA MLD or not.

Example embodiments of the present disclosure relate to systems, methods, and devices for multi-link traffic steering with traffic indication map (TIM).

In one or more embodiments, a multi-link traffic steering system may facilitate that in the partial virtual bitmap of the TIM element sent on link 1 (or any other link) associated with a receiving device STA1, the bit (called here TIM bit) corresponding to the AID of STA1 is set to 1 to indicate that the access point (AP) MLLE (also can be referred as multi-link device (MLD)) has buffered bufferable units (BUs) for the station device (STA) MLD. The BUs can be retrieved in any of the enabled links the AP MLD and the STA MLD, after an indication that the STA MLD is in the awake state on that link (note that the indication can be sent on any link).

In one or more embodiments, a multi-link traffic steering system may each link between two MLDs (e.g., AP and STA MLDs) may be established to transmit data. The AP MLD may send a beacon on each of the links established with the STA MLD. Each of these beacon frames may carry the same information in the corresponding TIM element. The TIM element may comprise a bitmap, where each bit inside the bitmap correspond to index associated with an AID. This in turn indicated to a device or link having a first AID, that the content of the bit is intended for it. This way each device (e.g., STA MLD) knowing its own AID can access the bitmap and look at the bit that corresponds to it. Based on the value of the bit, the STA MLD may determine whether there is data or buffer units that may be delivered by the AP MLD. This way, the STA MLD can wake up on any of its links based on the corresponding bit value.

In one or more embodiments, a multi-link traffic steering system may facilitate that a TIM element carried in a beacon between an AP MLD and STA MLD on one of the established links between them may indicate that the status of buffer units available for the STA MLD without having to specify a link that may be established between two logical entities of the AP MLD and the STA MLD.

In one or more embodiments, a multi-link traffic steering system may facilitate that the STA MLD can wake up on any of its established links and receive the data that was held in buffer at the AP. In other words, if there are three logical entities inside the AP MLD (e.g., AP1, AP2, and AP3), each of these logical entities will include the same TIM element in their corresponding beacon frame.

In one or more embodiments, an AID is associated with a specific STA MLD and not to a specific logical entity (e.g., STA1, STA2, or STA3) inside the STA MLD. A difference is that the STA MLD can now decide which link to retrieve the data on. However, in some scenarios an AID may be assigned on a per link basis such that if the STA MLD has three logical entities (e.g., STA1, STA2, or STA3), there may be three AIDs that are assigned to the STA MLD, where each AID corresponds to one of its logical entities.

In one or more embodiments, a multi-link traffic steering system may facilitate that and AP MLD may provide recommendations on which link to use for retrieving buffered data associated with an STA MLD. For example, an AP MLD may indicate to them STA MLD that there are BUs to be retrieved and at the same time the AP MLD may indicate that it prefers that the STA MLD uses a specific link established between them. This may be based on a determination by the AP MLD on the status of each of the established links between the AP MLD and the STA MLD (e.g., load level, interference level, signal-to-noise ratio on a per link basis.

In one or more embodiments, a multi-link traffic steering system may utilize the TIM element by assigning multiple bits in the bitmap to the same STA MLD. The number of assigned bits may be based on the number of links. In this example, if there are two links established between the AP MLD and the STA MLD, two bits will be assigned in the bitmap to the STA MLD, such that, a first bit may represent the first link and a second bit may represent the second link. Therefore, if the first bit is set to 1, this may indicate to the STA MLD that there is data to be retrieved and the AP MLD prefers that the first link may be used to retrieve the data. If both bits are set to zero, this would indicate to the STA MLD that there is no data to be retrieved. If both bits are set to 1, this may indicate to the STA MLD that it can wake up either of its links (e.g., first link or second living) to retrieve the data.

In one or more embodiments, a multi-link traffic steering system may facilitate that the STA MLD and the AP MLD may negotiate on the type of traffic that may be associated with each of the links that may be established between the AP MLD and the STA MLD. For example, voice may be used on the first link and data may be used on the second link (in a two links scenario). This way, the AP could recommend which link to use based on the type of data being delivered.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

FIG. 1 is a network diagram illustrating an example network environment of multi-link traffic steering, according to some example embodiments of the present disclosure. Wireless network 100 may include one or more user devices 120 and one or more access points(s) (AP) 102, which may communicate in accordance with IEEE 802.11 communication standards. The user device(s) 120 may be mobile devices that are non-stationary (e.g., not having fixed locations) or may be stationary devices.

Figure 6:
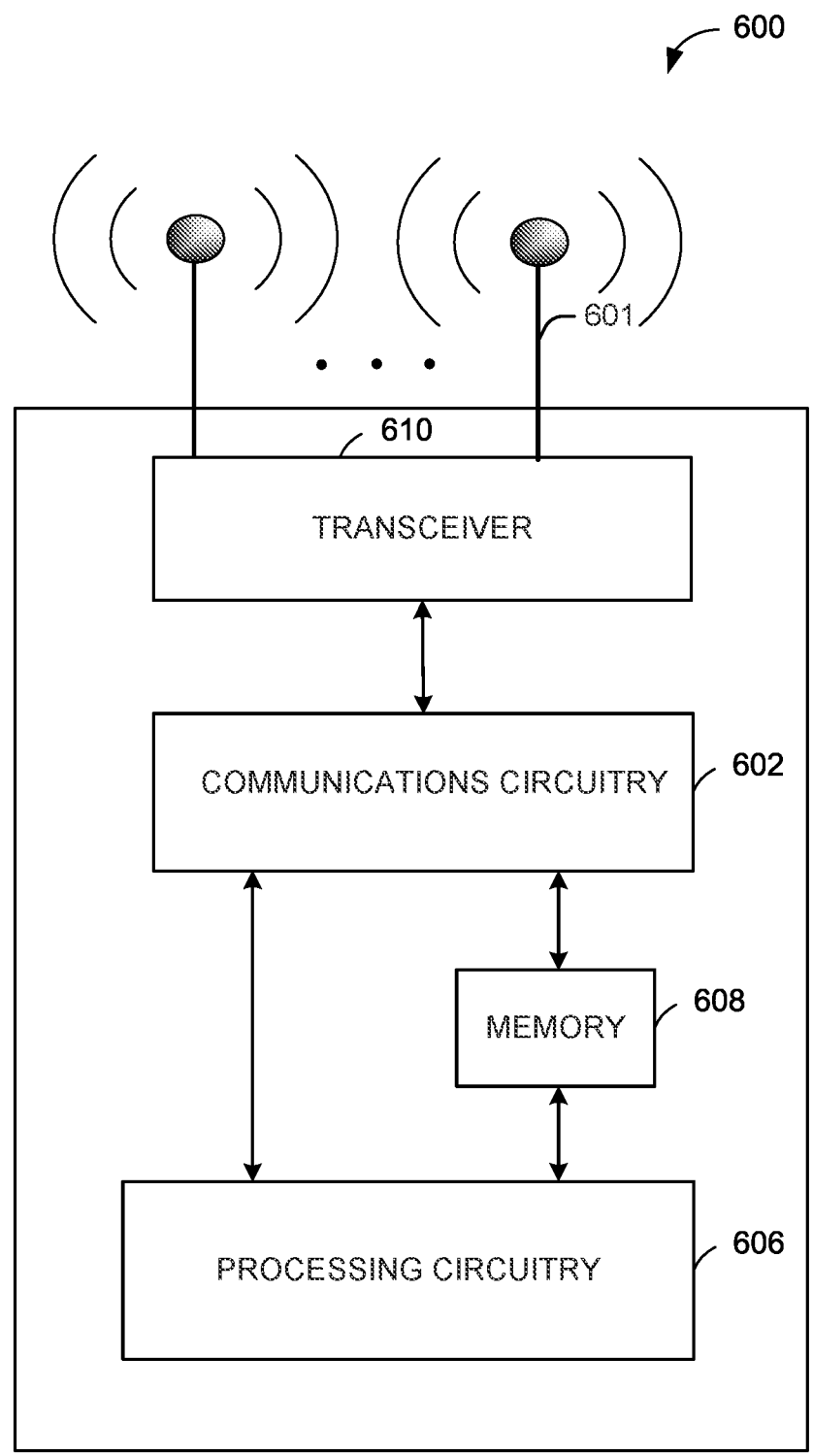
FIG. 6 illustrates a functional diagram of an exemplary communication station that may be suitable for use as a user device, in accordance with one or more example embodiments of the present disclosure.
Figure 7:
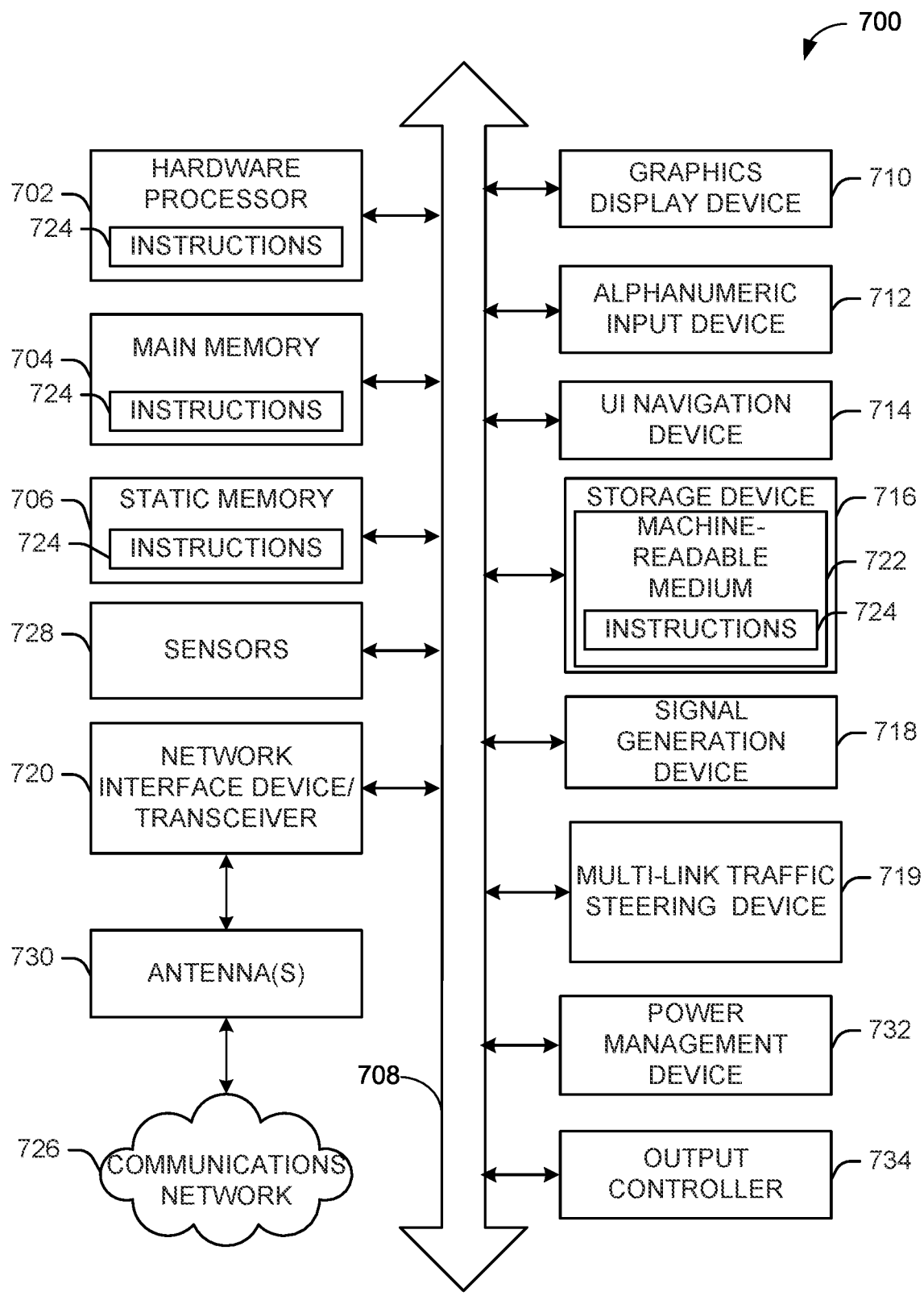
FIG. 7 illustrates a block diagram of an example machine upon which any of one or more techniques (e.g., methods) may be performed, in accordance with one or more example embodiments of the present disclosure.

In some embodiments, the user devices 120 and the AP 102 may include one or more computer systems similar to that of the functional diagram of FIG. 6 and/or the example machine/system of FIG. 7.

One or more illustrative user device(s) 120 and/or AP(s) 102 may be operable by one or more user(s) 110. It should be noted that any addressable unit may be a station (STA). An STA may take on multiple distinct characteristics, each of which shape its function. For example, a single addressable unit might simultaneously be a portable STA, a quality-of-service (QoS) STA, a dependent STA, and a hidden STA. The one or more illustrative user device(s) 120 and the AP(s) 102 may be STAs. The one or more illustrative user device(s) 120 and/or AP(s) 102 may operate as a personal basic service set (PBSS) control point/access point (PCP/AP). The user device(s) 120 (e.g., 124, 126, or 128) and/or AP(s) 102 may include any suitable processor-driven device including, but not limited to, a mobile device or a non-mobile, e.g., a static device. For example, user device(s) 120 and/or AP(s) 102 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

The user device(s) 120 and/or AP(s) 102 may also include mesh stations in, for example, a mesh network, in accordance with one or more IEEE 802.11 standards and/or 3GPP standards.

Any of the user device(s) 120 (e.g., user devices 124, 126, 128), and AP(s) 102 may be configured to communicate with each other via one or more communications networks 130 and/or 135 wirelessly or wired. The user device(s) 120 may also communicate peer-to-peer or directly with each other with or without the AP(s) 102. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128) and AP(s) 102 may include one or more communications antennas. The one or more communications antennas may be any suitable type of antennas corresponding to the communications protocols used by the user device(s) 120 (e.g., user devices 124, 126 and 128), and AP(s) 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP(s) 102.

Any of the user device(s) 120 (e.g., user devices 124, 126, 128), and AP(s) 102 may be configured to perform directional transmission and/or directional reception in conjunction with wirelessly communicating in a wireless network. Any of the user device(s) 120 (e.g., user devices 124, 126, 128), and AP(s) 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and AP(s) 102 may be configured to perform any given directional transmission towards one or more defined transmit sectors. Any of the user device(s) 120 (e.g., user devices 124, 126, 128), and AP(s) 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP(s) 102 may be configured to use all or a subset of its one or more communications antennas to perform MIMO beamforming.

Any of the user devices 120 (e.g., user devices 124, 126, 128), and AP(s) 102 may include any suitable radio and/or transceiver for transmitting and/or receiving radio frequency (RF) signals in the bandwidth and/or channels corresponding to the communications protocols utilized by any of the user device(s) 120 and AP(s) 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g., 802.11b, 802.11g, 802.11n, 802.11ax), 5 GHz channels (e.g., 802.11n, 802.11ac, 802.11ax), or 60 GHZ channels (e.g., 802.11ad, 802.11ay). 800 MHz channels (e.g., 802.11ah). The communications antennas may operate at 28 GHz and 40 GHz. It should be understood that this list of communication channels in accordance with certain 802.11 standards is only a partial list and that other 802.11 standards may be used (e.g., Next Generation Wi-Fi, or other standards). In some embodiments, non-Wi-Fi protocols may be used for communications between devices, such as Bluetooth, dedicated short-range communication (DSRC), Ultra-High Frequency (UHF) (e.g., IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In one embodiment, and with reference to FIG. 1, AP(s) 102 may facilitate multi-link traffic steering 142 with one or more user devices 120.

In FIG. 1, there is shown that each of the user devices (STAs) is considered as an MLD, where the user device may comprise one or more logical entity devices. For example, it is shown that an AP MLD 102 may comprise AP 1, . . . , AP N, where N is a positive integer and that STA MLD 124 may comprise STA 1, . . . , STA M, where M is a positive integer.

In one or more embodiments, a multi-link traffic steering 142 may facilitate that in the partial virtual bitmap of the TIM element sent on link 1 (or any other link) associated with a receiving device STA 1, the bit (called here TIM bit) corresponding to the AID of STA 1 is set to 1 to indicate that the AP MLD 102 has buffered bufferable units (BUs) for the STA MLD. The BUs can be retrieved in any of the enabled links the AP MLD and the STA MLD, after an indication that the STA MLD is in the awake state on that link (note that the indication can be sent on any link).

In one or more embodiments, a multi-link traffic steering 142 may each link between two MLDs (e.g., AP and STA MLDs) may be established to transmit data. The AP MLD may send a beacon on each of the links established with the STA MLD. Each of these beacon frames may carry the same information in the corresponding TIM element. The TIM element may comprise a bitmap, where each bit inside the bitmap correspond to index associated with an AID. This in turn indicated to a device or link having a first AID, that the content of the bit is intended for it. This way each device (e.g., STA MLD) knowing its own AID can access the bitmap and look at the bit that corresponds to it. Based on the value of the bit, the STA MLD may determine whether there is data or buffer units that may be delivered by the AP MLD. This way, the STA MLD can wake up on any of its links based on the corresponding bit value.

In one or more embodiments, a multi-link traffic steering 142 may facilitate that a TIM element carried in a beacon between an AP MLD and STA MLD on one of the established links between them may indicate that the status of buffer units available for the STA MLD without having to specify a link that may be established between two logical entities of the AP MLD and the STA MLD.

In one or more embodiments, a multi-link traffic steering 142 may facilitate that the STA MLD can wake up on any of its established links and receive the data that was held in buffer at the AP. In other words, if there are three logical entities inside the AP MLD (e.g., AP1, AP2, and AP3), each of these logical entities will include the same TIM element in their corresponding beacon frame.

In one or more embodiments, an AID is associated with a specific STA MLD and not to a specific logical entity (e.g., STA1, STA2, or STA3) inside the STA MLD. A difference is that the STA MLD can now decide which link to retrieve the data on. However, in some scenarios an AID may be assigned on a per link basis such that if the STA MLD has three logical entities (e.g., STA1, STA2, or STA3), there may be three AIDs that are assigned to the STA MLD, where each AID corresponds to one of its logical entities.

In one or more embodiments, a multi-link traffic steering 142 may facilitate that and AP MLD may provide recommendations on which link to use for retrieving buffered data associated with an STA MLD. For example, an AP MLD may indicate to them STA MLD that there are BUs to be retrieved and at the same time the AP MLD may indicate that it prefers that the STA MLD uses a specific link established between them. This may be based on a determination by the AP MLD on the status of each of the established links between the AP MLD and the STA MLD (e.g., load level, interference level, signal-to-noise ratio on a per link basis.

In one or more embodiments, a multi-link traffic steering 142 may utilize the TIM element by assigning multiple bits in the bitmap to the same STA MLD. The number of assigned bits may be based on the number of links. In this example, if there are two links established between the AP MLD and the STA MLD, two bits will be assigned in the bitmap to the STA MLD, such that, a first bit may represent the first link and a second bit may represent the second link. Therefore, if the first bit is set to 1, this may indicate to the STA MLD that there is data to be retrieved and the AP MLD prefers that the first link may be used to retrieve the data. If both bits are set to zero, this would indicate to the STA MLD that there is no data to be retrieved. If both bits are set to 1, this may indicate to the STA MLD that it can wake up either of its links (e.g., first link or second living) to retrieve the data.

In one or more embodiments, a multi-link traffic steering 142 may facilitate that the STA MLD and the AP MLD may negotiate on the type of traffic that may be associated with each of the links that may be established between the AP MLD and the STA MLD. For example, voice may be used on the first link and data may be used on the second link (in a two links scenario). This way, the AP could recommend which link to use based on the type of data being delivered.

It is understood that the above descriptions are for purposes of illustration and are not meant to be limiting.

Figure 2:
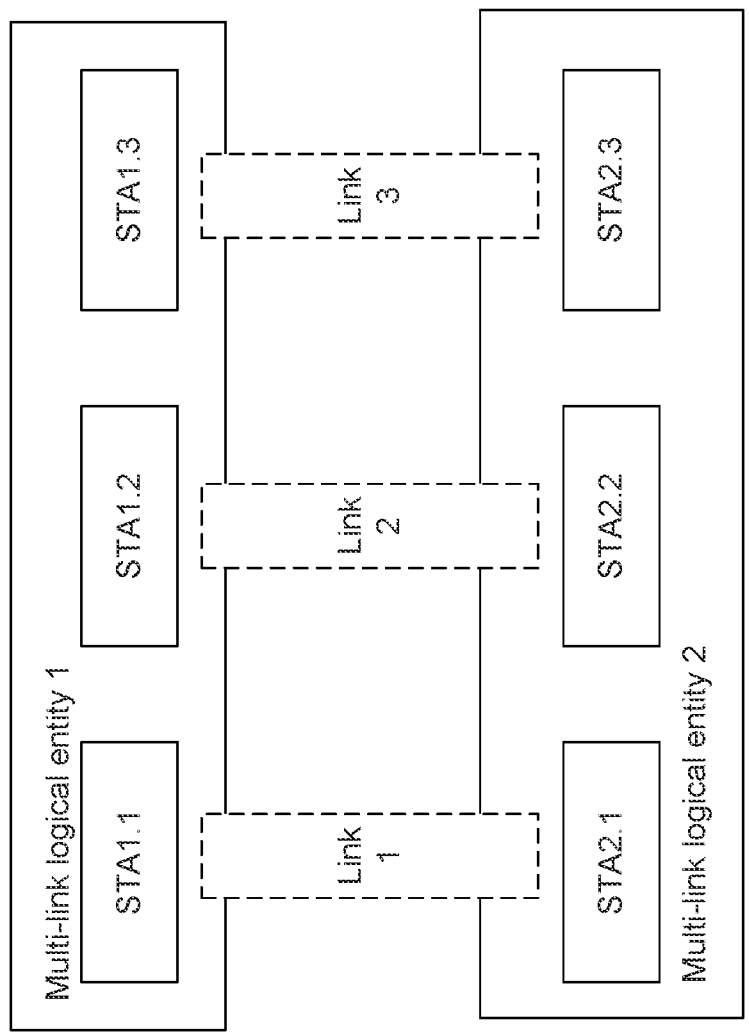
FIG. 2 depicts an illustrative schematic diagram for multi-link device (MLD) between two logical entities, in accordance with one or more example embodiments of the present disclosure.

FIG. 2 depicts an illustrative schematic diagram 200 for multi-link device (MLD) between two logical entities, in accordance with one or more example embodiments of the present disclosure.

Referring to FIG. 2, there are shown two multi-link logical entities on either side which includes multiple STAs that can set up links with each other. Multi-link logical entity may be a logical entity that contains one or more STAs. The logical entity has one MAC data service interface and primitives to the logical link control (LLC) and a single address associated with the interface, which can be used to communicate on the distribution system medium (DSM). It should be noted that a Multi-link logical entity allows STAs within the multi-link logical entity to have the same MAC address. It should also be noted that the exact name can be changed.

In this example of FIG. 2, the multi-link logical entity 1 and multi-link logical entity 2 may be two separate physical devices, where each one comprises a number of virtual or logical devices. For example, multi-link logical entity 1 may comprise three STAs, STA1.1, STA1.2, and STA1.3 and multi-link logical entity 2 that may comprise three STAs, STA2.1, STA2.2, and STA2.3. The example shows that logical device STA1.1 is communicating with logical device STA2.1 over link 1, that logical device STA1.2 is communicating with logical device STA2.2 over link 2, and that device STA1.3 is communicating with logical device STA2.3 over link 3.

Figure 3:
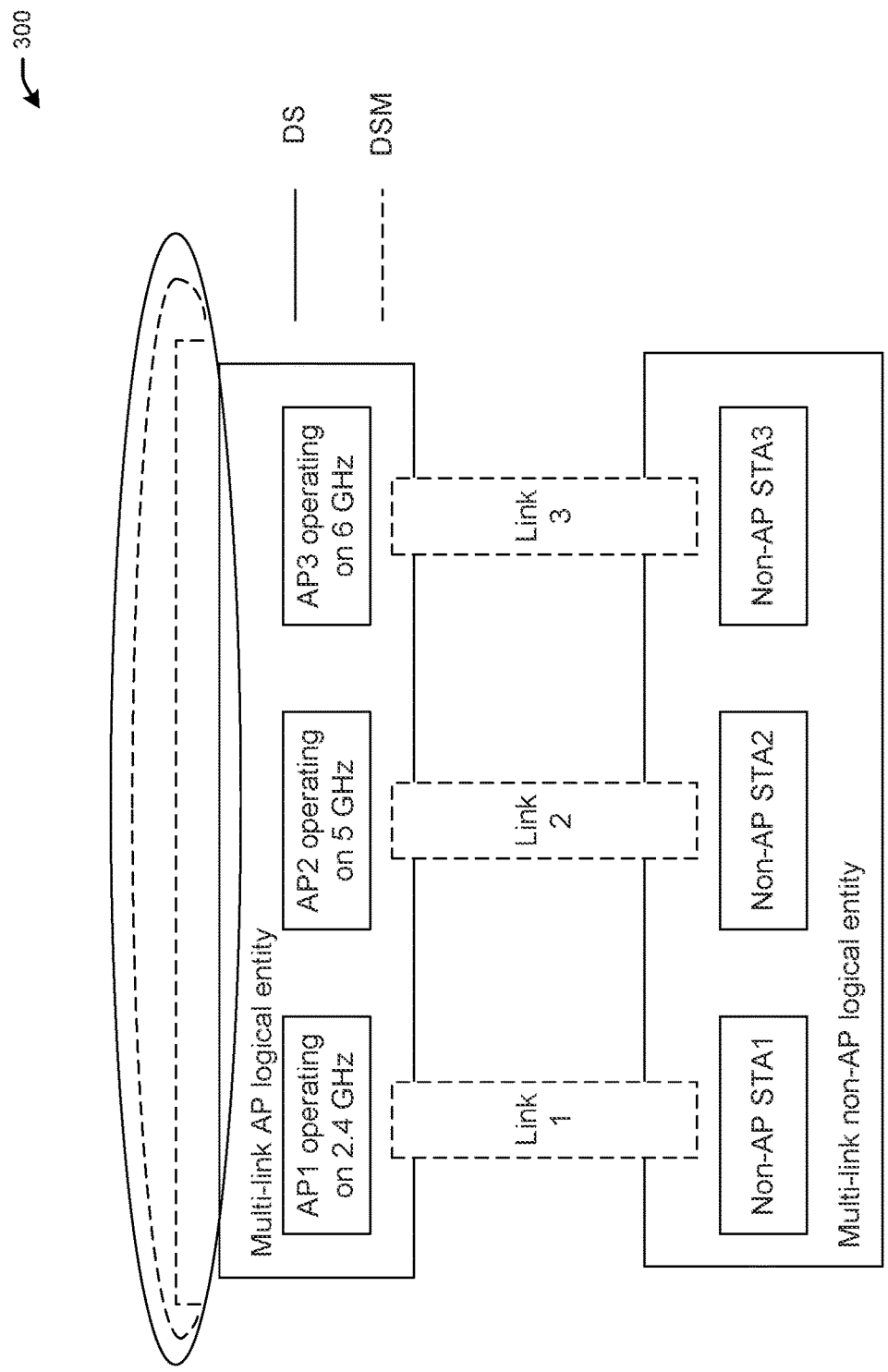
FIG. 3 depicts an illustrative schematic diagram for multi-link device (MLD) between AP with logical entities and a non-AP with logical entities, in accordance with one or more example embodiments of the present disclosure.

FIG. 3 depicts an illustrative schematic diagram 300 for multi-link device (MLD) between AP with logical entities and a non-AP with logical entities, in accordance with one or more example embodiments of the present disclosure.

Referring to FIG. 3, there are shown two multi-link logical entities on either side which includes multiple STAs that can set up links with each other. For infrastructure framework, a multi-link AP logical entity may include APs (e.g., AP1, AP2, and AP3) on one side, and multi-link non-AP logical entity, which may include non-APs (STA1, STA2, and STA3) on the other side. The detailed definition is shown below. Multi-link AP logical entity (AP MLD also can be referred to as AP MLD): A multi-link logical entity, where each STA within the multi-link logical entity is an EHT AP. It should be noted that the term MLD and MLD are interchangeable and indicate the same type of entity. Throughout this disclosure, MLD may be used but anywhere the MLD term is used, it can be replaced with MLD. Multi-link non-AP logical entity (non-AP MLD, also can be referred to as non-AP MLD): A multi-link logical entity, where each STA within the multi-link logical entity is a non-AP EHT STA. It should be noted that this framework is a natural extension from the one link operation between two STAs, which are AP and non-AP STA under the infrastructure framework (e.g., when an AP is used as a medium for communication between STAs).

In the example of FIG. 3, the multi-link AP logical entity and multi-link non-AP logical entity may be two separate physical devices, where each one comprises a number of virtual or logical devices. For example, the multi-link AP logical entity may comprise three APs, AP1 operating on 2.4 GHz, AP2 operating on 5 GHz, and AP3 operating on 6 GHz. Further, the multi-link non-AP logical entity may comprise three non-AP STAs, STA1 communicating with AP1 on link 1, STA2 communicating with AP2 on link 2, and STA3 communicating with AP3 on link 3.

The multi-link AP logical entity is shown in FIG. 3 to have access to a distribution system (DS), which is a system used to interconnect a set of BSSs to create an extended service set (ESS). The multi-link AP logical entity is also shown in FIG. 3 to have access a distribution system medium (DSM), which is the medium used by a DS for BSS interconnections. Simply put, DS and DSM allow the AP to communicate with different BSSs.

It should be understood that although the example shows three logical entities within the multi-link AP logical entity and the three logical entities within the multi-link non-AP logical entity, this is merely for illustration purposes and that other numbers of logical entities with each of the multi-link AP and non-AP logical entities may be envisioned.

Figure 4:
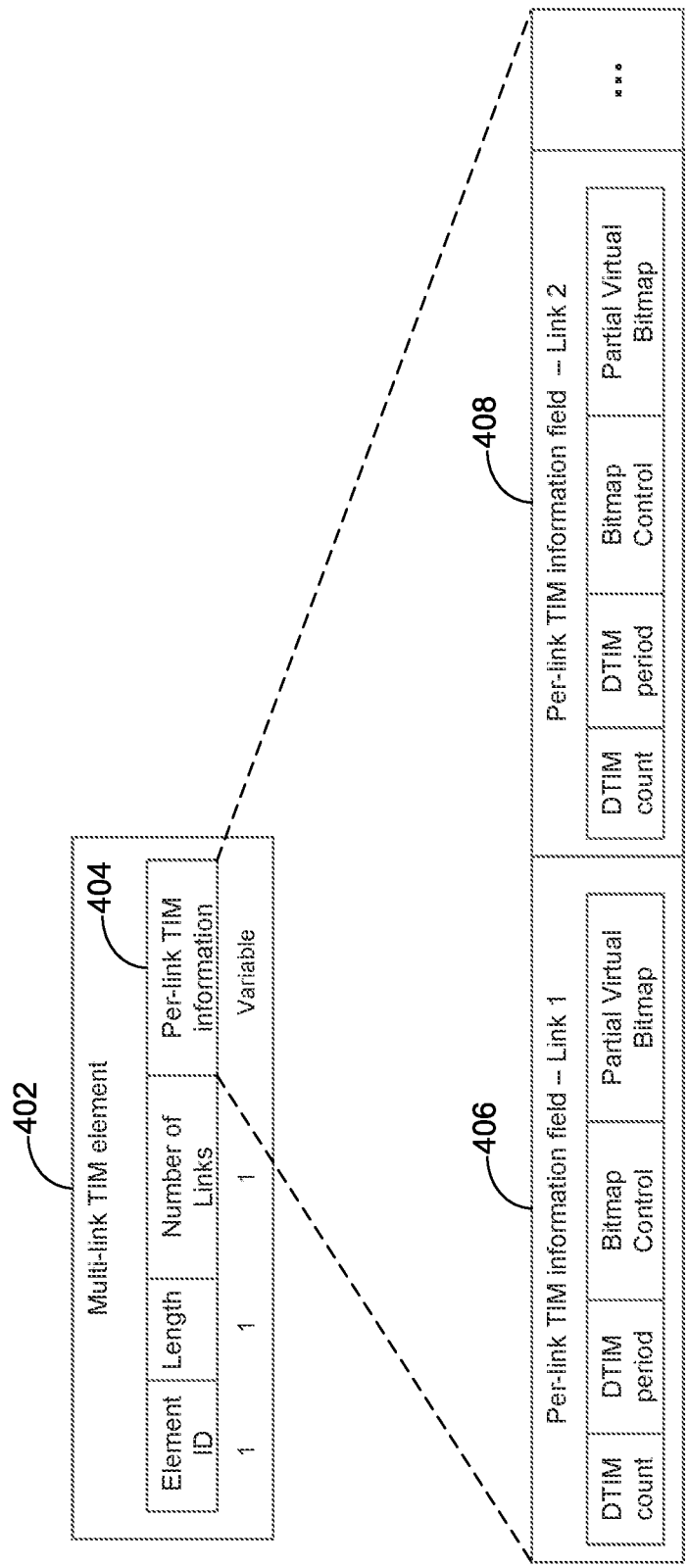
FIG. 4 depicts an illustrative schematic diagram for a multi-link element, in accordance with one or more example embodiments of the present disclosure.

FIG. 4 depicts an illustrative schematic diagram for a multi-link element, in accordance with one or more example embodiments of the present disclosure.

Referring to FIG. 4, there is shown an example of a multi-link TIM element 402, which comprises one or more fields. The one or more fields include an element ID, length, number of links, per-link TIM information 404. The per-link TIM information 404 field is comprised of a number information fields associated with N number of links, where N is a positive integer. In this example, there is shown a per-link TIM information 406 for link 1 and per-link TIM information 408 for link 2. Each of the per-link TIM information 406 fields may comprise a delivery traffic indication map (DTIM) count, a DTIM, a bitmap control, and a partial virtual bitmap (also can be referred to as a TIM bitmap throughout this disclosure). Each non-AP MLD has one corresponding bit (using assigned AID) in the per-link TIM information field for link 1 (per-link TIM information 406) and in the per-link TIM information field for link 2 (per-link TIM information 408).

In one or more embodiments, a multi-link traffic steering system may include the multi-link TIM element 402 in a new frame or an existing, such as an OPS frame. Also, a TIM element may be included in a new frame or an existing frame.

In one or more embodiments, a multi-link traffic steering system may use an indication of buffered data at AP MLD side (and not AP side) in the TIM element in a beacon frame. The indication may indicate that the non-AP MLD has data that it can retrieve on any enabled link.

In one or more embodiments, an non-AP MLD may have a unique AID which helps in the fact that no non-AP MLD will access the same AID index in the Partial Virtual Bitmap in the TIM element in all links to get the information whether it has buffered data or not at the AP MLD. In one or more embodiments, the indication may be an information from the AP of which link is recommended to use (where the non-AP MLD would get better latency/throughput, . . . ).

In one or more embodiments, if the indication is send in a unicast way, there is no need for multi-non-AP MLD bitmaps. Just a link bitmap for one STA, so 2 bits or 3 bits if there are 2 links or 3 links. This can be carried in an A-ctrl in any frame, or through a new frame or element.

Based on that info, the STA wakes up on the recommended link if it wants to follow the recommendation to get the buffered data In one or more embodiments, assuming an AP MLD with 2 APs on 2 links (AP1 on link 1 and AP2 on link 2), and STA MLDs with 2 STAs on the 2 links (STA1 on link 1 and STA2 on link 2), with all links enabled and TID-to-link mapping defined so that all TIDs are allowed to be sent in all links.

In one or more embodiments, in the partial virtual bitmap of the TIM element sent on link 1, the bit (called here TIM bit) corresponding to the AID of STA1 is set to 1 to indicate that the AP MLD has buffered BUs for the STA MLD.

In one or more embodiments, the BUs can be retrieved in any of the enabled links (link 1 and link2), after an indication that the STA is in the awake state on that link (note that the indication can be sent on any link).

In one or more embodiments, if the beacon carries 2 TIM bits for a STA MLD, one for each STA (STA 1 and STA2), or more precisely for each link (link 1 and link2), 2 bits can be carried by:

Either assigning different AIDs to the 2 STAs of the STA MLDs (one AID1 for STA1 and one AID2 for STA2), and including in the bitmap of the TIM element all the AIDs (of STAs on the 2 links: AID1 and AID2)

Or by assigning AIDs to the 2 STAs of the STA MLDs (one AID1 for STA1 and one AID2 for STA2, with AID1 can be equal or different than AID2 in that option) and including only the AIDs of the STAs operating in the same link as the one on which the beacon is sent (AID1 on link1) in the TIM element (as currently done today), and including a new element called Multi-link TIM (ML-TIM) that will include the linkID of link2 and the AIDs of the STAs that operate on link2 (for example, AID2).

In that case:

If one or more of the bits corresponding to a STA MLD (corresponding to AID1 and AID2 in the example for the STA MLD) is set to 1, then the AP has buffered BUs for the STA and the STA can wake up in any enabled links, and indicate it is awake in that link to be delivered the BUs on that link.

If the 2 bits are set to 0, then the AP does not have BUs for the STA.

If only one of the 2 bits is set to 1 (and the other is set to 0), then the AP has buffered traffic for the STA MLD, that can be delivered in any link, but the AP indicates to the STA that it is recommended to wake up on the link with the bit set to 1. The reason could be either that the load on that link would allow for faster delivery of the BUs, or that the BUs are already queued in that particular AP/link and it would take a shorter time for the AP to deliver the BUs on that link (compared to delivering them in the other link, where it would need to de-queue/re-queue the BUs)

If the 2 bits are set to 1, that indicates that the AP does not have a preference on the link on which the BUs should be delivered if the STA is a single radio STA, and that it is recommended to wake up on both links if the STA is a dual radio STA.

Note that this idea may be enhanced by assuming that it is also an indication that the STA should/shall use its maximum bandwidth and antennas when waking up, as this is an indication that the BUs are large. However, it can also be a small BU but with latency constraint for which there is no need for large bandwidth or max number of antennas. For that reason, the fact that this combination would also mean this (max BW and spatial streams (SS)), if defined, should be activated or not activated with some signaling in the operation element or an OMI (operating mode indication).

Even though the concept is presented here with only 2 links this also covers the extension to more than 2 links.

In one or more embodiments, a multi-link traffic steering system may separate the TIM included in a beacon frame, which is just an indication that the AP MLD has BUs for the STA MLD, without recommendation of where the BU should be delivered—BUs can be delivered in any enabled links. In that case, only one bit per STA MLD is needed in the TIM element in the beacon.

In one or more embodiments, a multi-link traffic steering system may facilitate the scheduling information or traffic steering recommendation, which is including with Multi-link OPS (ML-OPS). For this, the AP will send on each link (link 1 as an example) an OPS frame that contains a TIM element for the same link (link 1), and a TIM element associated with a linkID field for link 2. In that case, each STA MLD will also have 2 bits representing the 2 links (link 1 and 2) and they may be encoded as follows:

If STA is known to be awake on both links:
  1-0: means that the STA will be scheduled on link 1 in the coming OPS SP.
  0-1: means that the STA will be scheduled on link 2 in the coming OPS SP.
  1-1: means that the STA will be scheduled on both links in the coming OPS SP.
  0-0: means that the STA not scheduled.

If STA is known to be in doze in both links:
  0-0: means that the STA not scheduled.
  1-0: means that the STA is recommended to wake up on link1.
  0-1: means that the STA is recommended to wake up on link2.
  1-1: means that the STA is recommended to wake up on both links if the STA MLD is dual radio, or is recommended to wake up (in any links).

If STA is known to be awake on link 1 and in doze on link 2:
  0-0: means that the STA is not scheduled on link1.
  1-0: means that the STA is scheduled on link1.
  0-1: means that the STA is not scheduled on link1 and STA is recommended to wake up on link2.
  1-1: means that the STA is scheduled on link1 and STA is recommended to wake up on link2 also.

It is understood that the above descriptions are for purposes of illustration and are not meant to be limiting.

Figure 5:
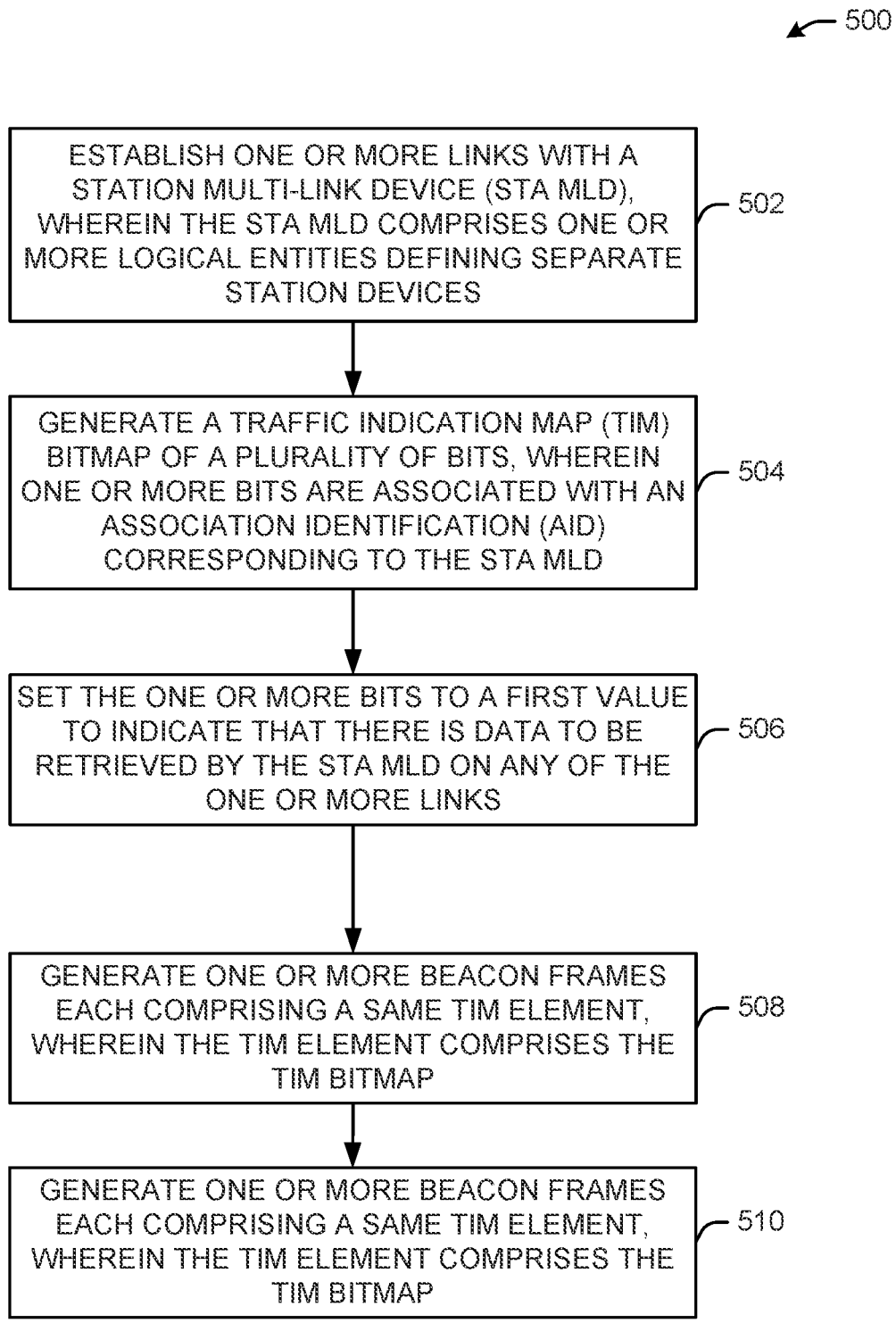
FIG. 5 illustrates a flow diagram of illustrative process for an illustrative multi-link traffic steering system, in accordance with one or more example embodiments of the present disclosure.

FIG. 5 illustrates a flow diagram of illustrative process 500 for a multi-link traffic steering system, in accordance with one or more example embodiments of the present disclosure.

At block 502, a device (e.g., the user device(s) 120 and/or the AP 102 of FIG. 1) may establish one or more links with a station multi-link device (STA MLD), wherein the STA MLD comprises one or more logical entities defining separate station devices.

At block 504, the device may generate a traffic indication map (TIM) bitmap of a plurality of bits, wherein one or more bits are associated with an association identification (AID) corresponding to the STA MLD. The STA MLD may use an AID index to lookup the corresponding bit in the TIM bitmap. A TIM bit of the TIM bitmap may be set to 1 to indicate that one or more BUs are available for the STA MLD to receive. The one or more BUs may be retrieved by the STA MLD on any enabled link of the one or more links.

At block 506, the device may set the one or more bits to a first value to indicate that there is data to be retrieved by the STA MLD on any of the one or more links. The device may set an additional bit to indicate a preference to retrieve the data by the STA MLD using a first link of the one or more links. The STA MLD may wake up the first link to be in an active state based on the preference indicated in the additional bit. The STA MLD may keep the rest of its one or more links in a doze state while the first link is in the active state. The device may assign a first AID to a first link of the STA MLD. The device may assign a second AID to a second link of the STA MLD. The device may assign a first bit in the TIM bitmap to be associated with the first AID indicating an availability of traffic destined to a first STA of the STA MLD associated with the first link. The device may assign a second bit in the TIM bitmap to be associated with the second AID indicating the availability of traffic destined to a second STA of the STA MLD associated with the second link.

At block 508, the device may generate one or more beacon frames each comprising a same TIM element, wherein the TIM element comprises the TIM bitmap.

At block 510, the device may cause to send one or more beacon frames on each of the one or more links.

It is understood that the above descriptions are for purposes of illustration and are not meant to be limiting.

FIG. 6 shows a functional diagram of an exemplary communication station 600, in accordance with one or more example embodiments of the present disclosure. In one embodiment, FIG. 6 illustrates a functional block diagram of a communication station that may be suitable for use as an AP 102 (FIG. 1) or a user device 120 (FIG. 1) in accordance with some embodiments. The communication station 600 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 600 may include communications circuitry 602 and a transceiver 610 for transmitting and receiving signals to and from other communication stations using one or more antennas 601. The communications circuitry 602 may include circuitry that can operate the physical layer (PHY) communications and/or medium access control (MAC) communications for controlling access to the wireless medium, and/or any other communications layers for transmitting and receiving signals. The communication station 600 may also include processing circuitry 606 and memory 608 arranged to perform the operations described herein. In some embodiments, the communications circuitry 602 and the processing circuitry 606 may be configured to perform operations detailed in the above figures, diagrams, and flows.

In accordance with some embodiments, the communications circuitry 602 may be arranged to contend for a wireless medium and configure frames or packets for communicating over the wireless medium. The communications circuitry 602 may be arranged to transmit and receive signals. The communications circuitry 602 may also include circuitry for modulation/demodulation, upconversion/downconversion, filtering, amplification, etc. In some embodiments, the processing circuitry 606 of the communication station 600 may include one or more processors. In other embodiments, two or more antennas 601 may be coupled to the communications circuitry 602 arranged for sending and receiving signals. The memory 608 may store information for configuring the processing circuitry 606 to perform operations for configuring and transmitting message frames and performing the various operations described herein. The memory 608 may include any type of memory, including non-transitory memory, for storing information in a form readable by a machine (e.g., a computer). For example, the memory 608 may include a computer-readable storage device, read-only memory (ROM), random-access memory (RAM), magnetic disk storage media, optical storage media, flash-memory devices and other storage devices and media.

In some embodiments, the communication station 600 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 600 may include one or more antennas 601. The antennas 601 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 600 may include one or more of a keyboard, a display, a non-volatile memory port, multiple antennas, a graphics processor, an application processor, speakers, and other mobile device elements. The display may be an LCD screen including a touch screen.

Although the communication station 600 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 600 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 600 may include one or more processors and may be configured with instructions stored on a computer-readable storage device.

FIG. 7 illustrates a block diagram of an example of a machine 700 or system upon which any one or more of the techniques (e.g., methodologies) discussed herein may be performed. In other embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environments. The machine 700 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a power management device 732, a graphics display device 710, an alphanumeric input device 712 (e.g., a keyboard), and a user interface (UI) navigation device 714 (e.g., a mouse). In an example, the graphics display device 710, alphanumeric input device 712, and UI navigation device 714 may be a touch screen display. The machine 700 may additionally include a storage device (i.e., drive unit) 716, a signal generation device 718 (e.g., a speaker), a multi-link traffic steering device 719, a network interface device/transceiver 720 coupled to antenna(s) 730, and one or more sensors 728, such as a global positioning system (GPS) sensor, a compass, an accelerometer, or other sensor. The machine 700 may include an output controller 734, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)). The operations in accordance with one or more example embodiments of the present disclosure may be carried out by a baseband processor. The baseband processor may be configured to generate corresponding baseband signals. The baseband processor may further include physical layer (PHY) and medium access control layer (MAC) circuitry, and may further interface with the hardware processor 702 for generation and processing of the baseband signals and for controlling operations of the main memory 704, the storage device 716, and/or the multi-link traffic steering device 719. The baseband processor may be provided on a single radio card, a single chip, or an integrated circuit (IC).

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within the static memory 706, or within the hardware processor 702 during execution thereof by the machine 700. In an example, one or any combination of the hardware processor 702, the main memory 704, the static memory 706, or the storage device 716 may constitute machine-readable media.

The multi-link traffic steering device 719 may carry out or perform any of the operations and processes (e.g., process 500) described and shown above.

It is understood that the above are only a subset of what the multi-link traffic steering device 719 may be configured to perform and that other functions included throughout this disclosure may also be performed by the multi-link traffic steering device 719.

While the machine-readable medium 722 is illustrated as a single medium, the term "machine-readable medium" may include a single medium or multiple media (e.g., a centralized or distributed database, and/or associated caches and servers) configured to store the one or more instructions 724.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 700 and that cause the machine 700 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device/transceiver 720 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 720 may include one or more physical jacks (e.g., Ethernet, coaxial, or phone jacks) or one or more antennas to connect to the communications network 726. In an example, the network interface device/transceiver 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 700 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Figure 8:
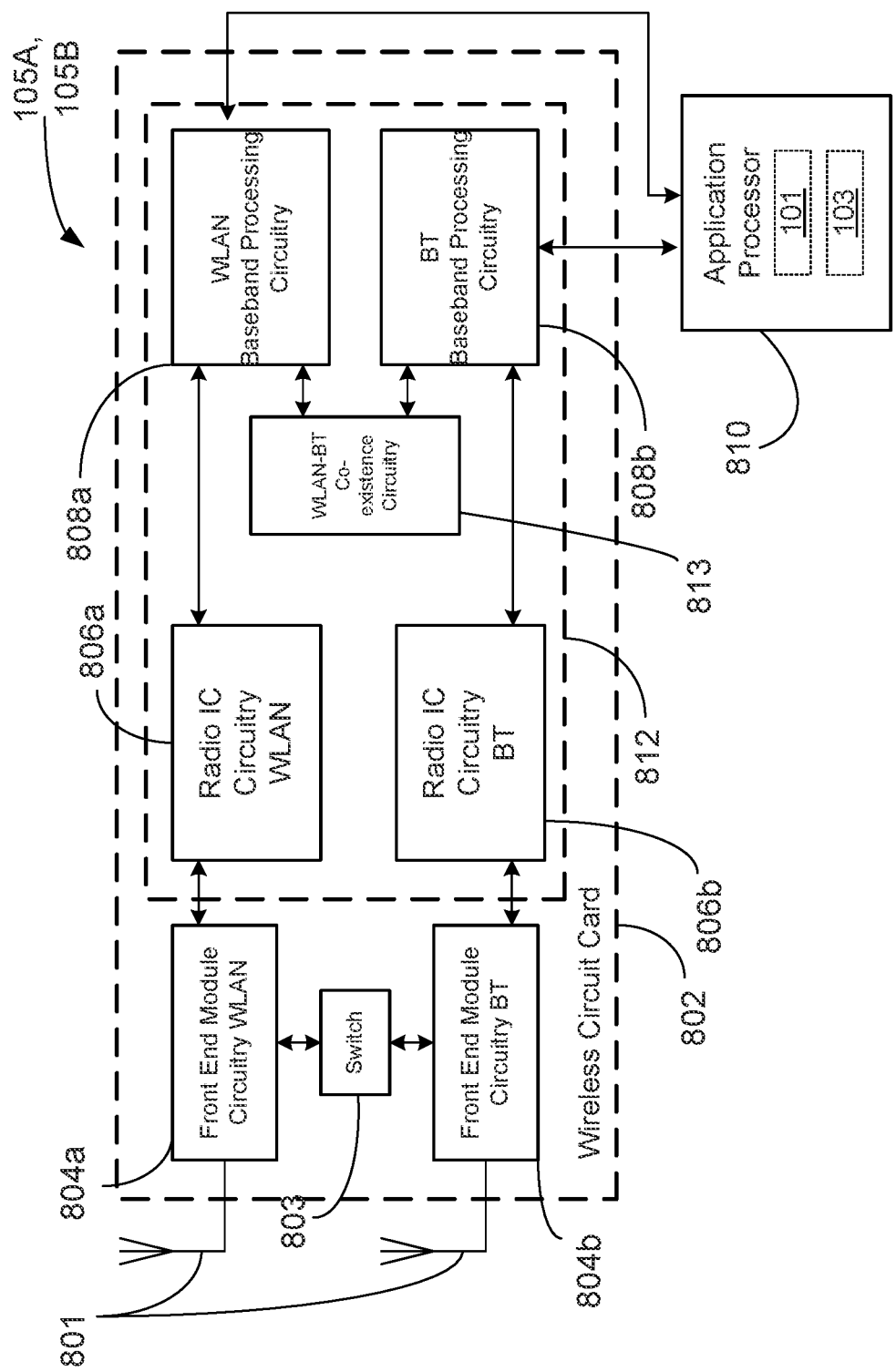
FIG. 8 is a block diagram of a radio architecture in accordance with some examples.

FIG. 8 is a block diagram of a radio architecture 105A, 105B in accordance with some embodiments that may be implemented in any one of the example AP 102 and/or the example STA(s) 120 of FIG. 1. Radio architecture 105A, 105B may include radio front-end module (FEM) circuitry 804a-b, radio IC circuitry 806a-b and baseband processing circuitry 808a-b. Radio architecture 105A, 105B as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 804a-b may include a WLAN or Wi-Fi FEM circuitry 804a and a Bluetooth (BT) FEM circuitry 804b. The WLAN FEM circuitry 804a may include a receive signal path comprising circuitry configured to operate on WLAN RF signals received from one or more antennas 801, to amplify the received signals and to provide the amplified versions of the received signals to the WLAN radio IC circuitry 806a for further processing. The BT FEM circuitry 804b may include a receive signal path which may include circuitry configured to operate on BT RF signals received from one or more antennas 801, to amplify the received signals and to provide the amplified versions of the received signals to the BT radio IC circuitry 806b for further processing. FEM circuitry 804a may also include a transmit signal path which may include circuitry configured to amplify WLAN signals provided by the radio IC circuitry 806a for wireless transmission by one or more of the antennas 801. In addition, FEM circuitry 804b may also include a transmit signal path which may include circuitry configured to amplify BT signals provided by the radio IC circuitry 806b for wireless transmission by the one or more antennas. In the embodiment of FIG. 8, although FEM 804a and FEM 804b are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 806a-b as shown may include WLAN radio IC circuitry 806a and BT radio IC circuitry 806b. The WLAN radio IC circuitry 806a may include a receive signal path which may include circuitry to down-convert WLAN RF signals received from the FEM circuitry 804a and provide baseband signals to WLAN baseband processing circuitry 808a. BT radio IC circuitry 806b may in turn include a receive signal path which may include circuitry to down-convert BT RF signals received from the FEM circuitry 804b and provide baseband signals to BT baseband processing circuitry 808b. WLAN radio IC circuitry 806a may also include a transmit signal path which may include circuitry to up-convert WLAN baseband signals provided by the WLAN baseband processing circuitry 808a and provide WLAN RF output signals to the FEM circuitry 804a for subsequent wireless transmission by the one or more antennas 801. BT radio IC circuitry 806b may also include a transmit signal path which may include circuitry to up-convert BT baseband signals provided by the BT baseband processing circuitry 808b and provide BT RF output signals to the FEM circuitry 804b for subsequent wireless transmission by the one or more antennas 801. In the embodiment of FIG. 8, although radio IC circuitries 806a and 806b are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 808a-b may include a WLAN baseband processing circuitry 808a and a BT baseband processing circuitry 808b. The WLAN baseband processing circuitry 808a may include a memory, such as, for example, a set of RAM arrays in a Fast Fourier Transform or Inverse Fast Fourier Transform block (not shown) of the WLAN baseband processing circuitry 808a. Each of the WLAN baseband circuitry 808a and the BT baseband circuitry 808b may further include one or more processors and control logic to process the signals received from the corresponding WLAN or BT receive signal path of the radio IC circuitry 806a-b, and to also generate corresponding WLAN or BT baseband signals for the transmit signal path of the radio IC circuitry 806a-b. Each of the baseband processing circuitries 808a and 808b may further include physical layer (PHY) and medium access control layer (MAC) circuitry, and may further interface with a device for generation and processing of the baseband signals and for controlling operations of the radio IC circuitry 806a-b.

Referring still to FIG. 8, according to the shown embodiment, WLAN-BT coexistence circuitry 813 may include logic providing an interface between the WLAN baseband circuitry 808a and the BT baseband circuitry 808b to enable use cases requiring WLAN and BT coexistence. In addition, a switch 803 may be provided between the WLAN FEM circuitry 804a and the BT FEM circuitry 804b to allow switching between the WLAN and BT radios according to application needs. In addition, although the antennas 801 are depicted as being respectively connected to the WLAN FEM circuitry 804a and the BT FEM circuitry 804b, embodiments include within their scope the sharing of one or more antennas as between the WLAN and BT FEMs, or the provision of more than one antenna connected to each of FEM 804a or 804b.

In some embodiments, the front-end module circuitry 804a-b, the radio IC circuitry 806a-b, and baseband processing circuitry 808a-b may be provided on a single radio card, such as wireless radio card 802. In some other embodiments, the one or more antennas 801, the FEM circuitry 804a-b and the radio IC circuitry 806a-b may be provided on a single radio card. In some other embodiments, the radio IC circuitry 806a-b and the baseband processing circuitry 808a-b may be provided on a single chip or integrated circuit (IC), such as IC 812.

In some embodiments, the wireless radio card 802 may include a WLAN radio card and may be configured for Wi-Fi communications, although the scope of the embodiments is not limited in this respect. In some of these embodiments, the radio architecture 105A, 105B may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 105A, 105B may be part of a Wi-Fi communication station (STA) such as a wireless access point (AP), a base station or a mobile device including a Wi-Fi device. In some of these embodiments, radio architecture 105A, 105B may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2016, 802.11n-2009, 802.11ac, 802.11ah, 802.11ad, 802.11ay and/or 802.11ax standards and/or proposed specifications for WLANs, although the scope of embodiments is not limited in this respect. Radio architecture 105A, 105B may also be suitable to transmit and/or receive communications in accordance with other techniques and standards.

In some embodiments, the radio architecture 105A, 105B may be configured for high-efficiency Wi-Fi (HEW) communications in accordance with the IEEE 802.11ax standard. In these embodiments, the radio architecture 105A, 105B may be configured to communicate in accordance with an OFDMA technique, although the scope of the embodiments is not limited in this respect.

In some other embodiments, the radio architecture 105A, 105B may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 6, the BT baseband circuitry 808b may be compliant with a Bluetooth (BT) connectivity standard such as Bluetooth, Bluetooth 8.0 or Bluetooth 6.0, or any other iteration of the Bluetooth Standard.

In some embodiments, the radio architecture 105A, 105B may include other radio cards, such as a cellular radio card configured for cellular (e.g., 5GPP such as LTE, LTE-Advanced or 7G communications).

In some IEEE 802.11 embodiments, the radio architecture 105A, 105B may be configured for communication over various channel bandwidths including bandwidths having center frequencies of about 900 MHz, 2.4 GHz, 5 GHz, and bandwidths of about 2 MHz, 4 MHz, 5 MHz, 5.5 MHz, 6 MHz, 8 MHz, 10 MHz, 20 MHz, 40 MHz, 80 MHz (with contiguous bandwidths) or 80+80 MHz (160 MHz) (with non-contiguous bandwidths). In some embodiments, a 920 MHz channel bandwidth may be used. The scope of the embodiments is not limited with respect to the above center frequencies however.

Figure 9:
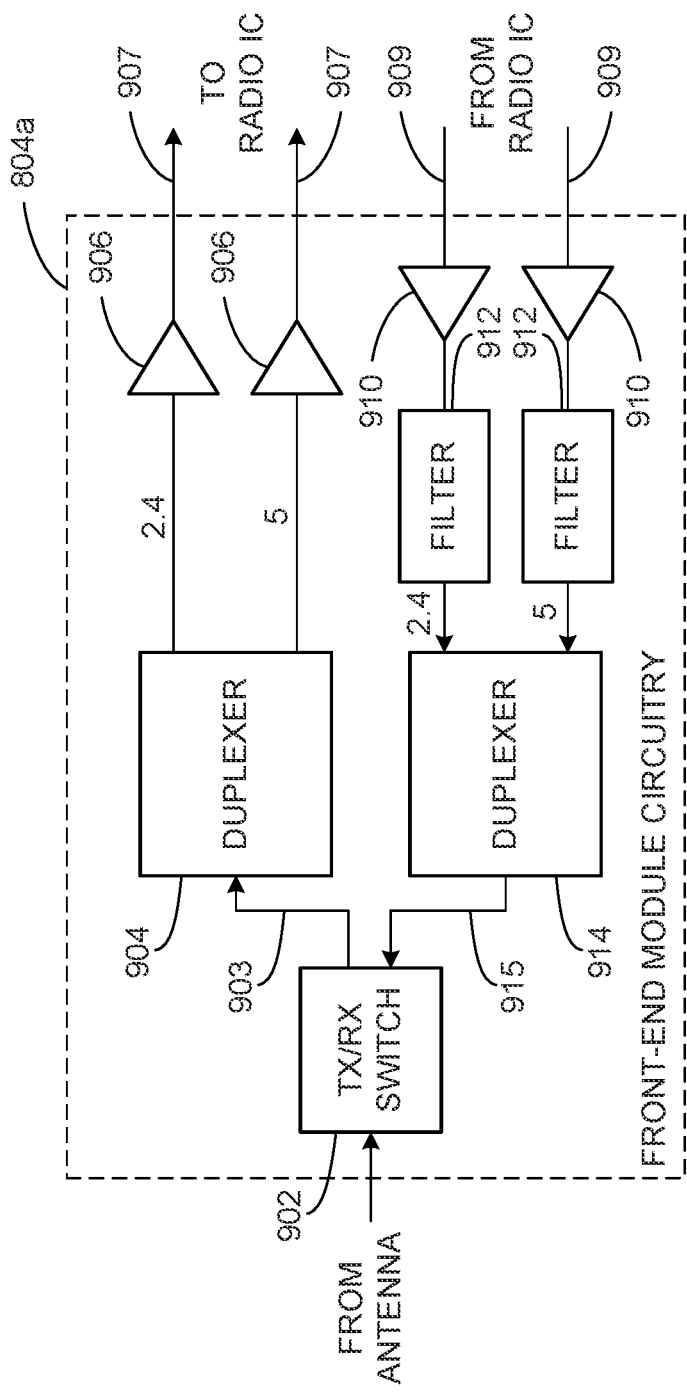
FIG. 9 illustrates an example front-end module circuitry for use in the radio architecture of FIG. 8, in accordance with one or more example embodiments of the present disclosure.

FIG. 9 illustrates WLAN FEM circuitry 804a in accordance with some embodiments. Although the example of FIG. 9 is described in conjunction with the WLAN FEM circuitry 804a, the example of FIG. 9 may be described in conjunction with the example BT FEM circuitry 804b (FIG. 8), although other circuitry configurations may also be suitable.

In some embodiments, the FEM circuitry 804a may include a TX/RX switch 902 to switch between transmit mode and receive mode operation. The FEM circuitry 804a may include a receive signal path and a transmit signal path. The receive signal path of the FEM circuitry 804a may include a low-noise amplifier (LNA) 906 to amplify received RF signals 903 and provide the amplified received RF signals 907 as an output (e.g., to the radio IC circuitry 806a-b (FIG. 8)). The transmit signal path of the circuitry 804a may include a power amplifier (PA) to amplify input RF signals 909 (e.g., provided by the radio IC circuitry 806a-b), and one or more filters 912, such as band-pass filters (BPFs), low-pass filters (LPFs) or other types of filters, to generate RF signals 915 for subsequent transmission (e.g., by one or more of the antennas 801 (FIG. 8)) via an example duplexer 914.

In some dual-mode embodiments for Wi-Fi communication, the FEM circuitry 804a may be configured to operate in either the 2.4 GHz frequency spectrum or the 5 GHz frequency spectrum. In these embodiments, the receive signal path of the FEM circuitry 804a may include a receive signal path duplexer 904 to separate the signals from each spectrum as well as provide a separate LNA 906 for each spectrum as shown. In these embodiments, the transmit signal path of the FEM circuitry 804a may also include a power amplifier 910 and a filter 912, such as a BPF, an LPF or another type of filter for each frequency spectrum and a transmit signal path duplexer 904 to provide the signals of one of the different spectrums onto a single transmit path for subsequent transmission by the one or more of the antennas 801 (FIG. 8). In some embodiments, BT communications may utilize the 2.4 GHz signal paths and may utilize the same FEM circuitry 804a as the one used for WLAN communications.

Figure 10:
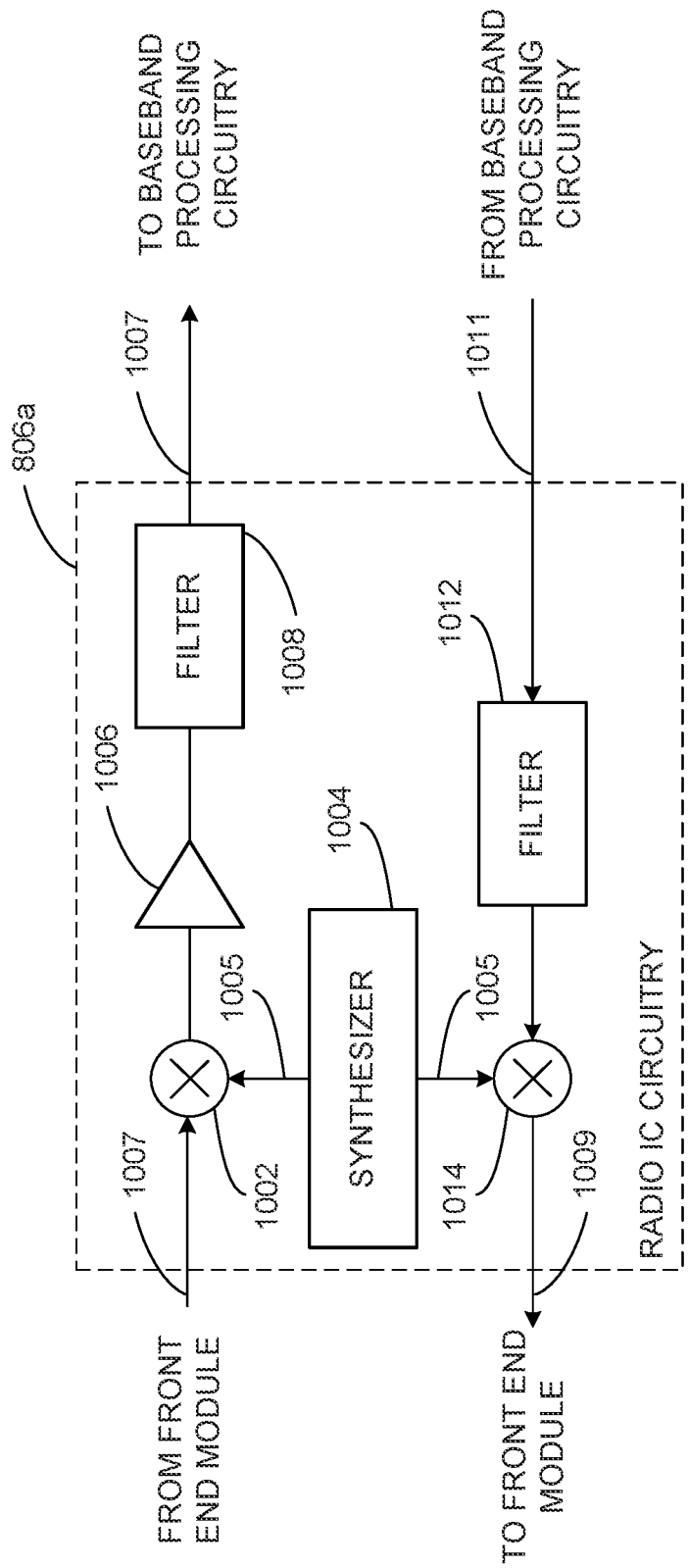
FIG. 10 illustrates an example radio IC circuitry for use in the radio architecture of FIG. 8, in accordance with one or more example embodiments of the present disclosure.

FIG. 10 illustrates radio IC circuitry 806a in accordance with some embodiments. The radio IC circuitry 806a is one example of circuitry that may be suitable for use as the WLAN or BT radio IC circuitry 806a/806b (FIG. 8), although other circuitry configurations may also be suitable. Alternatively, the example of FIG. 10 may be described in conjunction with the example BT radio IC circuitry 806b.

In some embodiments, the radio IC circuitry 806a may include a receive signal path and a transmit signal path. The receive signal path of the radio IC circuitry 806a may include at least mixer circuitry 1002, such as, for example, down-conversion mixer circuitry, amplifier circuitry 1006 and filter circuitry 1008. The transmit signal path of the radio IC circuitry 806a may include at least filter circuitry 1012 and mixer circuitry 1014, such as, for example, up-conversion mixer circuitry. Radio IC circuitry 806*a* may also include synthesizer circuitry 1004 for synthesizing a frequency 1005 for use by the mixer circuitry 1002 and the mixer circuitry 1014. The mixer circuitry 1002 and/or 1014 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 10 illustrates only a simplified version of a radio IC circuitry, and may include, although not shown, embodiments where each of the depicted circuitries may include more than one component. For instance, mixer circuitry 1014 may each include one or more mixers, and filter circuitries 1008 and/or 1012 may each include one or more filters, such as one or more BPFs and/or LPFs according to application needs. For example, when mixer circuitries are of the direct-conversion type, they may each include two or more mixers.

In some embodiments, mixer circuitry 1002 may be configured to down-convert RF signals 907 received from the FEM circuitry 804*a-b* (FIG. 8) based on the synthesized frequency 1005 provided by synthesizer circuitry 1004. The amplifier circuitry 1006 may be configured to amplify the down-converted signals and the filter circuitry 1008 may include an LPF configured to remove unwanted signals from the down-converted signals to generate output baseband signals 1007. Output baseband signals 1007 may be provided to the baseband processing circuitry 808*a-b* (FIG. 8) for further processing. In some embodiments, the output baseband signals 1007 may be zero-frequency baseband signals, although this is not a requirement. In some embodiments, mixer circuitry 1002 may comprise passive mixers, although the scope of the embodiments is not limited in this respect.

In some embodiments, the mixer circuitry 1014 may be configured to up-convert input baseband signals 1011 based on the synthesized frequency 1005 provided by the synthesizer circuitry 1004 to generate RF output signals 909 for the FEM circuitry 804*a-b*. The baseband signals 1011 may be provided by the baseband processing circuitry 808*a-b* and may be filtered by filter circuitry 1012. The filter circuitry 1012 may include an LPF or a BPF, although the scope of the embodiments is not limited in this respect.

In some embodiments, the mixer circuitry 1002 and the mixer circuitry 1014 may each include two or more mixers and may be arranged for quadrature down-conversion and/or up-conversion respectively with the help of synthesizer 1004. In some embodiments, the mixer circuitry 1002 and the mixer circuitry 1014 may each include two or more mixers each configured for image rejection (e.g., Hartley image rejection). In some embodiments, the mixer circuitry 1002 and the mixer circuitry 1014 may be arranged for direct down-conversion and/or direct up-conversion, respectively. In some embodiments, the mixer circuitry 1002 and the mixer circuitry 1014 may be configured for super-heterodyne operation, although this is not a requirement.

Mixer circuitry 1002 may comprise, according to one embodiment: quadrature passive mixers (e.g., for the in-phase (I) and quadrature phase (Q) paths). In such an embodiment, RF input signal 907 from FIG. 10 may be down-converted to provide I and Q baseband output signals to be sent to the baseband processor Quadrature passive mixers may be driven by zero and ninety-degree time-varying LO switching signals provided by a quadrature circuitry which may be configured to receive a LO frequency (fLO) from a local oscillator or a synthesizer, such as LO frequency 1005 of synthesizer 1004 (FIG. 10). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction is power consumption.

The RF input signal 907 (FIG. 9) may comprise a balanced signal, although the scope of the embodiments is not limited in this respect. The I and Q baseband output signals may be provided to low-noise amplifier, such as amplifier circuitry 1006 (FIG. 10) or to filter circuitry 1008 (FIG. 10).

In some embodiments, the output baseband signals 1007 and the input baseband signals 1011 may be analog baseband signals, although the scope of the embodiments is not limited in this respect. In some alternate embodiments, the output baseband signals 1007 and the input baseband signals 1011 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 1004 may be a fractional-N synthesizer or a fractional N/N+1 synthesizer, although the scope of the embodiments is not limited in this respect as other types of frequency synthesizers may be suitable. For example, synthesizer circuitry 1004 may be a delta-sigma synthesizer, a frequency multiplier, or a synthesizer comprising a phase-locked loop with a frequency divider. According to some embodiments, the synthesizer circuitry 1004 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 1004 may be provided by a voltage controlled oscillator (VCO), although that is not a requirement. A divider control input may further be provided by either the baseband processing circuitry 808*a-b* (FIG. 8) depending on the desired output frequency 1005. In some embodiments, a divider control input (e.g., N) may be determined from a look-up table (e.g., within a Wi-Fi card) based on a channel number and a channel center frequency as determined or indicated by the example application processor 810. The application processor 810 may include, or otherwise be connected to, one of the example secure signal converter 101 or the example received signal converter 103 (e.g., depending on which device the example radio architecture is implemented in).

In some embodiments, synthesizer circuitry 1004 may be configured to generate a carrier frequency as the output frequency 1005, while in other embodiments, the output frequency 1005 may be a fraction of the carrier frequency (e.g., one-half the carrier frequency, one-third the carrier frequency). In some embodiments, the output frequency 1005 may be a LO frequency (fLO).

Figure 11:
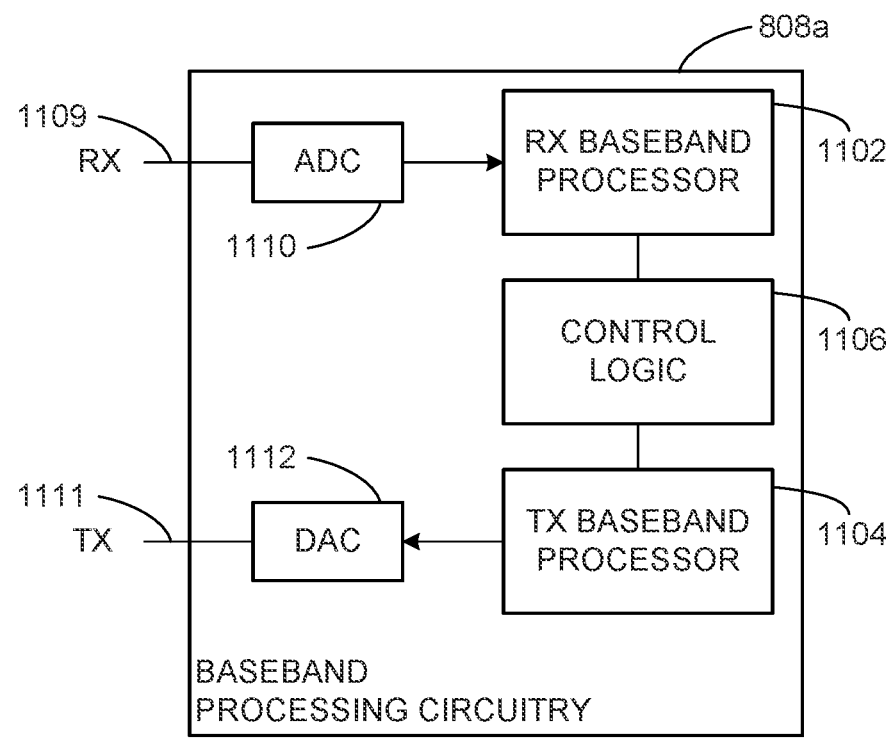
FIG. 11 illustrates an example baseband processing circuitry for use in the radio architecture of FIG. 8, in accordance with one or more example embodiments of the present disclosure.

FIG. 11 illustrates a functional block diagram of baseband processing circuitry 808a in accordance with some embodiments. The baseband processing circuitry 808a is one example of circuitry that may be suitable for use as the baseband processing circuitry 808a (FIG. 8), although other circuitry configurations may also be suitable. Alternatively, the example of FIG. 10 may be used to implement the example BT baseband processing circuitry 808b of FIG. 8.

The baseband processing circuitry 808a may include a receive baseband processor (RX BBP) 1102 for processing receive baseband signals 1009 provided by the radio IC circuitry 806a-b (FIG. 8) and a transmit baseband processor (TX BBP) 1104 for generating transmit baseband signals 1011 for the radio IC circuitry 806a-b. The baseband processing circuitry 808a may also include control logic 1106 for coordinating the operations of the baseband processing circuitry 808a.

In some embodiments (e.g., when analog baseband signals are exchanged between the baseband processing circuitry 808a-b and the radio IC circuitry 806a-b), the baseband processing circuitry 808a may include ADC 1110 to convert analog baseband signals 1109 received from the radio IC circuitry 806a-b to digital baseband signals for processing by the RX BBP 1102. In these embodiments, the baseband processing circuitry 808a may also include DAC 1112 to convert digital baseband signals from the TX BBP 1104 to analog baseband signals 1111.

In some embodiments that communicate OFDM signals or OFDMA signals, such as through baseband processor 808a, the transmit baseband processor 1104 may be configured to generate OFDM or OFDMA signals as appropriate for transmission by performing an inverse fast Fourier transform (IFFT). The receive baseband processor 1102 may be configured to process received OFDM signals or OFDMA signals by performing an FFT. In some embodiments, the receive baseband processor 1102 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 8, in some embodiments, the antennas 801 (FIG. 8) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 801 may each include a set of phased-array antennas, although embodiments are not so limited.

Although the radio architecture 105A, 105B is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

The following examples pertain to further embodiments.

Example 1 may include a device comprising processing circuitry coupled to storage, the processing circuitry configured to: establish one or more links with a station multi-link device (STA MLD), wherein the STA MLD comprises one or more logical entities defining separate station devices; generate a traffic indication map (TIM) bitmap of a plurality of bits, wherein one or more bits are associated with an association identification (AID) corresponding to the STA MLD; set the one or more bits to a first value to indicate that there may be data to be retrieved by the STA MLD on any of the one or more links; generate one or more beacon frames each comprising a same TIM element, wherein the TIM element comprises the TIM bitmap; and cause to send one or more beacon frames on each of the one or more links.

Example 2 may include the device of example 1 and/or some other example herein, wherein the STA MLD uses a AID index to lookup the corresponding bit in the TIM bitmap.

Example 3 may include the device of example 2 and/or some other example herein, wherein a TIM bit of the TIM bitmap may be set to 1 to indicate that one or more BUs are available for the STA MLD to receive.

Example 4 may include the device of example 3 and/or some other example herein, wherein the one or more BUs are retrieved by the STA MLD on any enabled link of the one or more links.

Example 5 may include the device of example 1 and/or some other example herein, wherein the processing circuitry may be further configured to set an additional bit to indicate a preference to retrieve the data by the STA MLD using a first link of the one or more links.

Example 6 may include the device of example 5 and/or some other example herein, wherein the STA MLD wakes up the first link to be in an active state based on the preference indicated in the additional bit.

Example 7 may include the device of example 6 and/or some other example herein, wherein the STA MLD keeps the rest of its one or more links in a doze state while the first link may be in the active state.

Example 8 may include the device of example 1 and/or some other example herein, wherein the processing circuitry may be further configured to: assign a first AID to a first link of the STA MLD; assign a second AID to a second link of the STA MLD; and assign a first bit in the TIM bitmap to be associated with the first AID indicating an availability of traffic destined to a first STA of the STA MLD associated with the first link; and assign a second bit in the TIM bitmap to be associated with the second AID indicating the availability of traffic destined to a second STA of the STA MLD associated with the second link.

Example 9 may include the device of example 1 and/or some other example herein, further comprising a transceiver configured to transmit and receive wireless signals.

Example 10 may include the device of example 9 and/or some other example herein, further comprising an antenna coupled to the transceiver to cause to send the one or more beacon frames.

Example 11 may include a non-transitory computer-readable medium storing computer-executable instructions which when executed by one or more processors result in performing operations comprising: establishing one or more links with a station multi-link device (STA MLD), wherein the STA MLD comprises one or more logical entities defining separate station devices; generating a traffic indication map (TIM) bitmap of a plurality of bits, wherein one or more bits are associated with an association identification (AID) corresponding to the STA MLD; setting the one or more bits to a first value to indicate that there may be data to be retrieved by the STA MLD on any of the one or more links; generating one or more beacon frames each comprising a same TIM element, wherein the TIM element comprises the TIM bitmap; and causing to send one or more beacon frames on each of the one or more links.

Example 12 may include the non-transitory computer-readable medium of example 11 and/or some other example herein, wherein the STA MLD uses a AID index to lookup the corresponding bit in the TIM bitmap.

Example 13 may include the non-transitory computer-readable medium of example 12 and/or some other example herein, wherein a TIM bit of the TIM bitmap may be set to 1 to indicate that one or more BUs are available for the STA MLD to receive.

Example 14 may include the non-transitory computer-readable medium of example 13 and/or some other example herein, wherein the one or more BUs are retrieved by the STA MLD on any enabled link of the one or more links.

Example 15 may include the non-transitory computer-readable medium of example 11 and/or some other example herein, wherein the operations further comprise setting an additional bit to indicate a preference to retrieve the data by the STA MLD using a first link of the one or more links.

Example 16 may include the non-transitory computer-readable medium of example 15 and/or some other example herein, wherein the STA MLD wakes up the first link to be in an active state based on the preference indicated in the additional bit.

Example 17 may include the non-transitory computer-readable medium of example 16 and/or some other example herein, wherein the STA MLD keeps the rest of its one or more links in a doze state while the first link may be in the active state.

Example 18 may include the non-transitory computer-readable medium of example 11 and/or some other example herein, wherein the operations further comprise: assigning a first AID to a first link of the STA MLD; assigning a second AID to a second link of the STA MLD; and assigning a first bit in the TIM bitmap to be associated with the first AID indicating an availability of traffic destined to a first STA of the STA MLD associated with the first link; and assigning a second bit in the TIM bitmap to be associated with the second AID indicating the availability of traffic destined to a second STA of the STA MLD associated with the second link.

Example 19 may include a method comprising: establishing, by one or more processors, one or more links with a station multi-link device (STA MLD), wherein the STA MLD comprises one or more logical entities defining separate station devices; generating a traffic indication map (TIM) bitmap of a plurality of bits, wherein one or more bits are associated with an association identification (AID) corresponding to the STA MLD; setting the one or more bits to a first value to indicate that there may be data to be retrieved by the STA MLD on any of the one or more links; generating one or more beacon frames each comprising a same TIM element, wherein the TIM element comprises the TIM bitmap; and causing to send one or more beacon frames on each of the one or more links.

Example 20 may include the method of example 19 and/or some other example herein, wherein the STA MLD uses a AID index to lookup the corresponding bit in the TIM bitmap.

Example 21 may include the method of example 20 and/or some other example herein, wherein a TIM bit of the TIM bitmap may be set to 1 to indicate that one or more BUs are available for the STA MLD to receive.

Example 22 may include the method of example 21 and/or some other example herein, wherein the one or more BUs are retrieved by the STA MLD on any enabled link of the one or more links.

Example 23 may include the method of example 19 and/or some other example herein, further comprising setting an additional bit to indicate a preference to retrieve the data by the STA MLD using a first link of the one or more links.

Example 24 may include the method of example 23 and/or some other example herein, wherein the STA MLD wakes up the first link to be in an active state based on the preference indicated in the additional bit.

Example 25 may include the method of example 24 and/or some other example herein, wherein the STA MLD keeps the rest of its one or more links in a doze state while the first link may be in the active state.

Example 26 may include the method of example 19 and/or some other example herein, further comprising: assigning a first AID to a first link of the STA MLD; assigning a second AID to a second link of the STA MLD; and assigning a first bit in the TIM bitmap to be associated with the first AID indicating an availability of traffic destined to a first STA of the STA MLD associated with the first link; and assigning a second bit in the TIM bitmap to be associated with the second AID indicating the availability of traffic destined to a second STA of the STA MLD associated with the second link.

Example 27 may include an apparatus comprising means for: establishing one or more links with a station multi-link device (STA MLD), wherein the STA MLD comprises one or more logical entities defining separate station devices; generating a traffic indication map (TIM) bitmap of a plurality of bits, wherein one or more bits are associated with an association identification (AID) corresponding to the STA MLD; setting the one or more bits to a first value to indicate that there may be data to be retrieved by the STA MLD on any of the one or more links; generating one or more beacon frames each comprising a same TIM element, wherein the TIM element comprises the TIM bitmap; and causing to send one or more beacon frames on each of the one or more links.

Example 28 may include the apparatus of example 27 and/or some other example herein, wherein the STA MLD uses a AID index to lookup the corresponding bit in the TIM bitmap.

Example 29 may include the apparatus of example 28 and/or some other example herein, wherein a TIM bit of the TIM bitmap may be set to 1 to indicate that one or more BUs are available for the STA MLD to receive.

Example 30 may include the apparatus of example 29 and/or some other example herein, wherein the one or more BUs are retrieved by the STA MLD on any enabled link of the one or more links.

Example 31 may include the apparatus of example 27 and/or some other example herein, further comprising setting an additional bit to indicate a preference to retrieve the data by the STA MLD using a first link of the one or more links.

Example 32 may include the apparatus of example 31 and/or some other example herein, wherein the STA MLD wakes up the first link to be in an active state based on the preference indicated in the additional bit.

Example 33 may include the apparatus of example 32 and/or some other example herein, wherein the STA MLD keeps the rest of its one or more links in a doze state while the first link may be in the active state.

Example 34 may include the apparatus of example 27 and/or some other example herein, further comprising: assigning a first AID to a first link of the STA MLD; assigning a second AID to a second link of the STA MLD; and assigning a first bit in the TIM bitmap to be associated with the first AID indicating an availability of traffic destined to a first STA of the STA MLD associated with the first link; and assigning a second bit in the TIM bitmap to be associated with the second AID indicating the availability of traffic destined to a second STA of the STA MLD associated with the second link.

Example 35 may include one or more non-transitory computer-readable media comprising instructions to cause an electronic device, upon execution of the instructions by one or more processors of the electronic device, to perform one or more elements of a method described in or related to any of examples 1-34, or any other method or process described herein.

Example 36 may include an apparatus comprising logic, modules, and/or circuitry to perform one or more elements of a method described in or related to any of examples 1-34, or any other method or process described herein.

Example 37 may include a method, technique, or process as described in or related to any of examples 1-34, or portions or parts thereof.

Example 38 may include an apparatus comprising: one or more processors and one or more computer readable media comprising instructions that, when executed by the one or more processors, cause the one or more processors to perform the method, techniques, or process as described in or related to any of examples 1-34, or portions thereof.

Example 39 may include a method of communicating in a wireless network as shown and described herein.

Example 40 may include a system for providing wireless communication as shown and described herein.

Example 41 may include a device for providing wireless communication as shown and described herein.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. An access point multi-link device, the access point multi-link device comprising processing circuitry coupled to storage, the processing circuitry configured to:
generate a traffic indication map (TIM) bitmap comprising a first bit indicating whether the access point multi-link device (AP MLD) has buffered traffic for a station multi-link device (STA MLD) on a first communication link between a first logical AP entity of the AP MLD and a first logical STA entity of the STA MLD;
generate a beacon comprising the TIM bitmap, wherein the TIM bitmap includes at least one bit per link for the STA MLD, and the bit values indicate whether buffered traffic is available on respective links and a preferred link for delivery;

transmit the beacon using the first communication link or a second communication link between a second logical AP entity of the AP MLD and a second logical STA entity of the STA MLD;

identify a power save poll or an unscheduled automatic power save delivery (U-APSD) trigger frame received from the STA MLD in response to the beacon; and transmit the buffered traffic using at least one of the first communication link or the second communication link in response to receiving the power save poll or the U-APSD trigger frame.

2. The multi-link access point device of claim 1, wherein the first bit corresponds to an association identifier (AID) of the STA MLD.

3. The multi-link access point device of claim 1, wherein the TIM bitmap is included in a multi-link TIM element of the beacon, the multi-link TIM element further comprising an element identifier, an indication of a length of the multi-link TIM element, and an indication of a number of communication links for which the multi-link TIM element provides TIM bitmaps.

4. The multi-link access point device of claim 1, wherein the beacon further comprises a second TIM bitmap comprising a second bit indicating whether the AP MLD has buffered traffic for the STA MLD on the second communication link.

5. The multi-link access point device of claim 1, wherein a traffic identifier of the traffic maps to the first communication link.

6. The multi-link access point device of claim 1, wherein the buffered traffic is transmitted using the second communication link.

7. The multi-link access point device of claim 1, further comprising a transceiver configured to transmit and receive wireless signals comprising the beacon.

8. The multi-link access point device of claim 7, further comprising an antenna coupled to the transceiver to send the beacon.

9. A non-transitory computer-readable medium storing computer-executable instructions which when executed by one or more processors result in performing operations comprising:

generating a traffic indication map (TIM) bitmap comprising a first bit indicating whether an access point multi-link device (AP MLD) has buffered traffic for a station multi-link device (STA MLD) on a first communication link between a first logical AP entity of the AP MLD and a first logical STA entity of the STA MLD;

generating a beacon comprising the TIM bitmap, wherein the TIM bitmap includes at least one bit per link for the STA MLD, and the bit values indicate whether buffered traffic is available on respective links and a preferred link for delivery;

transmitting the beacon using the first communication link or a second communication link between a second logical AP entity of the AP MLD and a second logical STA entity of the STA MLD;

identifying a power save poll or an unscheduled automatic power save delivery (U-APSD) trigger frame received from the STA MLD in response to the beacon; and transmitting the buffered traffic using at least one of the first communication link or the second communication link in response to receiving the power save poll or the U-APSD trigger frame.

10. The non-transitory computer-readable medium of claim 9, wherein the first bit corresponds to an association identifier (AID) of the STA MLD.

11. The non-transitory computer-readable medium of claim 9, wherein the TIM bitmap is included in a multi-link TIM element of the beacon, the multi-link TIM element further comprising an element identifier, an indication of a length of the multi-link TIM element, and an indication of a number of communication links for which the multi-link TIM element provides TIM bitmaps.

12. The non-transitory computer-readable medium of claim 9, wherein the beacon further comprises a second TIM bitmap comprising a second bit indicating whether the AP MLD has buffered traffic for the STA MLD on the second communication link.

13. The non-transitory computer-readable medium of claim 9, wherein a traffic identifier of the traffic maps to the first communication link.

14. The non-transitory computer-readable medium of claim 9, wherein the buffered traffic is transmitted using the second communication link.

15. A method comprising:

generating, by processing circuitry of an access point multi-link device, a traffic indication map (TIM) bitmap comprising a first bit indicating whether the access point multi-link device (AP MLD) has buffered traffic for a station multi-link device (STA MLD) on a first communication link between a first logical AP entity of the AP MLD and a first logical STA entity of the STA MLD;

generating, by the processing circuitry, a beacon comprising the TIM bitmap, wherein the TIM bitmap includes at least one bit per link for the STA MLD, and the bit values indicate whether buffered traffic is available on respective links and a preferred link for delivery;

transmitting, by the processing circuitry, the beacon using the first communication link or a second communication link between a second logical AP entity of the AP MLD and a second logical STA entity of the STA MLD;

identifying, by the processing circuitry, a power save poll or an unscheduled automatic power save delivery (U-APSD) trigger frame received from the STA MLD in response to the beacon; and transmitting, by the processing circuitry, the buffered traffic using at least one of the first communication link or the second communication link in response to receiving the power save poll or the U-APSD trigger frame.

16. The method of claim 15, wherein the first bit corresponds to an association identifier (AID) of the STA MLD.

17. The method of claim 15, wherein the TIM bitmap is included in a multi-link TIM element of the beacon, the multi-link TIM element further comprising an element identifier, an indication of a length of the multi-link TIM element, and an indication of a number of communication links for which the multi-link TIM element provides TIM bitmaps.

18. The method of claim 15, wherein the beacon further comprises a second TIM bitmap comprising a second bit indicating whether the AP MLD has buffered traffic for the STA MLD on the second communication link.

19. The method of claim 15, wherein a traffic identifier of the traffic maps to the first communication link.

20. The method of claim 15, wherein the buffered traffic is transmitted using the second communication link.

\* \* \* \* \*